(12) United States Patent
Griffiths et al.

(10) Patent No.: US 9,846,284 B2
(45) Date of Patent: Dec. 19, 2017

(54) OPTICAL FIBER CONNECTOR ASSEMBLY

(71) Applicant: PRYSMIAN S.P.A., Milan (IT)

(72) Inventors: Ian Griffiths, Milan (IT); Matt Kerry, Milan (IT); Stephen Pike, Milan (IT)

(73) Assignee: PRYSMIAN S.P.A, Milan (IT)

( * ) Notice: Subject to any disclaimer, the term of this patent is extended or adjusted under 35 U.S.C. 154(b) by 0 days.

(21) Appl. No.: 15/501,644

(22) PCT Filed: Aug. 6, 2014

(86) PCT No.: PCT/EP2014/066917
§ 371 (c)(1),
(2) Date: Feb. 3, 2017

(87) PCT Pub. No.: WO2016/019992
PCT Pub. Date: Nov. 2, 2016

(65) Prior Publication Data
US 2017/0235064 A1   Aug. 17, 2017

(51) Int. Cl.
*G02B 6/36* (2006.01)
*G02B 6/38* (2006.01)

(52) U.S. Cl.
CPC .......... *G02B 6/3887* (2013.01); *G02B 6/3821* (2013.01); *G02B 6/3869* (2013.01);
(Continued)

(58) Field of Classification Search
CPC ..... G02B 6/381; G02B 6/3857; G02B 6/3877
See application file for complete search history.

(56) References Cited

U.S. PATENT DOCUMENTS

RE37,079 E  *  3/2001  Stephenson .......... G02B 6/3831
                                                    385/139
6,652,156 B2 * 11/2003  Shinagawa .......... G02B 6/3871
                                                    385/77
(Continued)

FOREIGN PATENT DOCUMENTS

WO     WO 03/050579      6/2003
WO     WO 2010/118031    10/2010

OTHER PUBLICATIONS

International Search Report from the European Patent Office for International Application No. PCT/EP2014/066917, dated Sep. 26, 2014.
(Continued)

*Primary Examiner* — Michelle R Connelly
(74) *Attorney, Agent, or Firm* — Finnegan, Henderson, Farabow, Garrett & Dunner, L.L.P.

(57) ABSTRACT

Optical fiber connector assembly for a fiber optic cable includes an optical fiber having an end portion terminated with a ferrule. The optical fiber connector assembly includes: a sleeve configured to at least partially house the end portion of the optical fiber terminated with the ferrule; a connector including a body extending lengthwise and having an internal passageway for the sleeve, the body having a distal portion, configured to house the sleeve and to mate with a corresponding receptacle, and a proximal portion configured to be coupled to an end portion of the fiber optic cable, the proximal portion having on its lateral surface at least one aperture; and a crimping element adapted to couple the proximal portion of the body to the end portion of the fiber optic cable at the at least one aperture. A pre-connectorized fiber optic cable includes a fiber optic cable and the optical fiber connector assembly mounted upon an end portion of the fiber optic cable.

16 Claims, 5 Drawing Sheets

(52) U.S. Cl.
CPC ......... *G02B 6/3874* (2013.01); *G02B 6/3877* (2013.01); *G02B 6/3894* (2013.01); *G02B 6/381* (2013.01)

(56) References Cited

U.S. PATENT DOCUMENTS

| | | | | |
|---|---|---|---|---|
| 6,856,750 | B2* | 2/2005 | Chang .................... | G02B 6/266 |
| | | | | 359/234 |
| 6,886,990 | B2* | 5/2005 | Taira .................... | G02B 6/3821 |
| | | | | 385/72 |
| 7,942,590 | B2* | 5/2011 | Lu ........................ | G02B 6/3816 |
| | | | | 385/78 |
| 9,250,395 | B2* | 2/2016 | Nielson ................ | G02B 6/3821 |
| 2003/0063867 | A1 | 4/2003 | McDonald et al. | |
| 2003/0077048 | A1 | 4/2003 | Radek et al. | |
| 2004/0047566 | A1 | 3/2004 | McDonald et al. | |
| 2009/0220197 | A1 | 9/2009 | Gniadek et al. | |
| 2010/0215321 | A1* | 8/2010 | Jenkins .................. | G02B 6/381 |
| | | | | 385/78 |
| 2010/0296778 | A1 | 11/2010 | Katagiyama et al. | |
| 2011/0002586 | A1 | 1/2011 | Nhep | |
| 2013/0011101 | A1 | 1/2013 | Katagiyama et al. | |
| 2016/0139345 | A1* | 5/2016 | Nielson ................ | G02B 6/3825 |
| | | | | 385/60 |
| 2017/0219780 | A1* | 8/2017 | Griffiths ............... | G02B 6/3887 |
| | | | | 385/78 |

OTHER PUBLICATIONS

Written Opinion of the International Searching Authority from the European Patent Office for International Application No. PCT/EP2014/066917, dated Sep. 26, 2014.

* cited by examiner

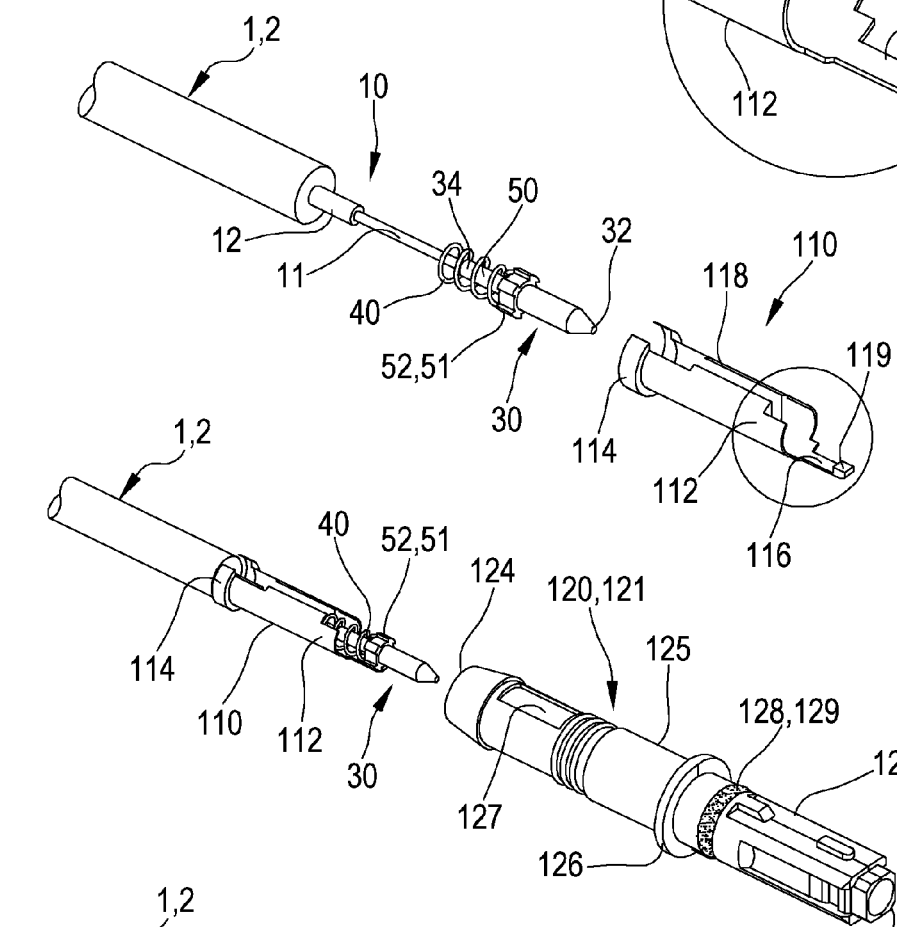
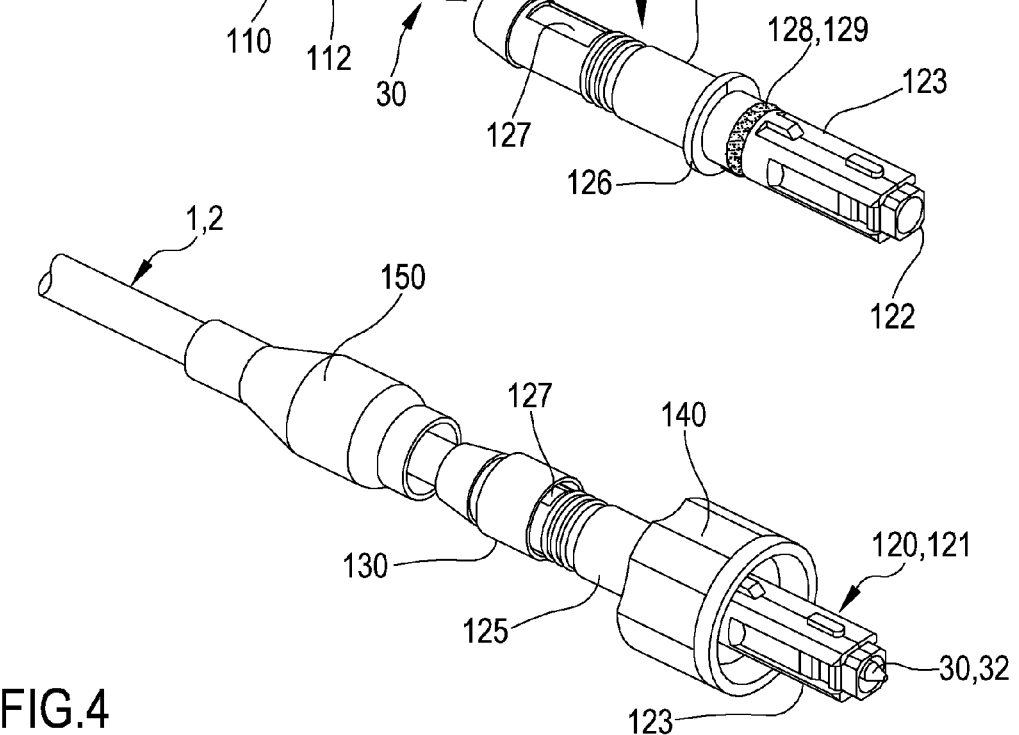

OPTICAL FIBER CONNECTOR ASSEMBLY

CROSS REFERENCE TO RELATED APPLICATION

This application is a national phase application based on PCT/EP2014/066917, filed Aug. 6, 2014, the content of which is incorporated herein by reference.

BACKGROUND OF THE INVENTION

Field of the Invention

The present invention relates to an optical fiber connector assembly. The present invention also relates to a pre-connectorized fiber optic cable comprising said optical fiber connector assembly.

Description of the Related Art

The connection of an optical fiber to another optical fiber is generally carried out by means of an optical connector. Generally, an optical fiber connector is a mechanical component used to align and join together two optical fibers. The optical fibers may be part of a fiber optic cable or of a device, such as an optical or opto-electronic device. A pre-connectorized fiber optic cable is generally a fiber optic cable having an end portion pre-terminated with an optical connector.

EP 1 430 339 discloses a fiber optic plug comprising a fiber optic connector. The fiber optic connector includes a connector housing and a plug ferrule at least partially disposed within the connector housing, a spring push having a forward end adapted to be inserted within and to engage the connector housing, and a spring disposed between the forward end of the spring push and the rear end of the plug ferrule. The fiber optic plug also comprises a crimp band and a plug body accommodating the fiber optic connector and the crimp band.

The spring push is coupled to the connector housing by means of tabs that engage corresponding recesses defined by the connector housing. The crimp band has a first end, which encircles and locks a rearward end of the spring push with the strength members disposed therebetween, and a second end, which surrounds the protective jacket of an end portion of the fiber optic cable and is crimped thereupon so as to engage the protective jacket. In addition, the crimp band is engaged with the plug body by means of a key carried by the crimp band and a corresponding passageway defined by the plug body.

The Applicant noted that in the fiber optic plug of EP 1 430 339 the crimp band couples together the end portion of the fiber optic cable with the spring push which, in its turn, engages the connector housing. The connector housing and the end portion of the fiber optic cable are thus coupled by means of an intermediate mechanical coupling. This coupling can reduce the mechanical strength and, in particular, the tensile strength of the whole fiber optic plug exposing the optical fibers to possible ruptures. In addition, this type of coupling also increases the complexity of the assembling and production operations of the fiber optic plug, significantly increasing the costs of the fiber optic plug.

The Applicant thus faced the technical problem of providing an optical fiber connector assembly with an alternative and improved design, which enables to increase the mechanical strength of the optical fiber connector assembly and to simplify the assembling and production thereof.

SUMMARY OF THE INVENTION

The Applicant has found that it is convenient to have an optical fiber connector assembly for a fiber optic cable comprising a connector having a distal portion, which is configured to house the optical fiber terminated with a ferrule and to mate with a corresponding receptacle, and a proximal portion, which is configured to be coupled to an end portion of the fiber optic cable, wherein the proximal portion has on its later surface at least one aperture for receiving a crimping element in order to crimp the jacket of the fiber optic cable, thereby reducing the number of pieces of the whole assembly and simplifying the assembling operations.

In a first aspect the present invention thus relates to an optical fiber connector assembly for a fiber optic cable comprising an optical fiber having an end portion terminated with a ferrule, the optical fiber connector assembly comprising:

a sleeve configured to at least partially house the end portion of the optical fiber terminated with the ferrule;

a connector comprising a body extending lengthwise and having an internal passageway for the sleeve, the body having a distal portion configured to house the sleeve and a proximal portion configured to be coupled to an end portion of the fiber optic cable, the proximal portion having on its later surface at least one aperture;

a crimping element adapted to couple the proximal portion of the body to the end portion of the fiber optic cable at said at least one aperture.

The above configuration enables to directly couple the end portion of the fiber optic cable to the body of the connector. This advantageously allows to reduce the number of mechanical couplings, to increase the mechanical strength and, in particular, the tensile strength of the optical fiber connector assembly, and to simplify the production and assembling thereof.

In a second aspect, the present invention relates to a pre-connectorized fiber optic cable comprising a fiber optic cable and an optical fiber connector assembly mounted upon an end portion of the fiber optic cable, the fiber optic cable comprising a jacket accommodating an optical fiber having an end portion terminated with a ferrule, the optical fiber connector assembly comprising:

a sleeve at least partially housing the end portion of the optical fiber terminated with the ferrule;

a connector comprising a body extending lengthwise and having an internal passageway for the sleeve, the body having a distal portion housing the sleeve and a proximal portion disposed about the end portion of the fiber optic cable, the proximal portion having on its later surface at least one aperture;

a crimping element crimped about the proximal portion of the body at said at least one aperture so as to couple said proximal portion to the end portion of the fiber optic cable.

For the purpose of the present description and of the appended claims, except where otherwise indicated, all numbers expressing amounts, quantities, percentages, and so forth, are to be understood as being modified in all instances by the term "about".

Also, all ranges include any combination of the maximum and minimum points disclosed and include any intermediate ranges therein, which may or may not be specifically enumerated herein.

In the present description, the terms "distal", "proximal", "forward", "back", "front" in relation to an optical fiber connector assembly are used with reference to an end portion of a fiber optic cable upon which the optical fiber connector assembly is mounted. In particular, the terms "proximal" and "back" are used with reference to an element of the optical fiber connector assembly situated near to the end portion of the fiber optic cable, while the terms "distal", "front" and "forward" are used with reference to an element of the optical fiber connector assembly situated away from the end portion of the fiber optic cable.

The present invention in at least one of the aforementioned aspects can have at least one of the following preferred characteristics.

In a preferred embodiment, the sleeve comprises at least one finger projecting from a distal end of the sleeve.

Preferably, the ferrule comprises a flange and each finger defines an engagement member adapted to mate with one of a corresponding plurality of engagement members defined by the flange.

Preferably, the at least one finger is configured to provide a support for the ferrule so that a distal end of the ferrule projects beyond the at least one finger.

Preferably, the body of the connector is monolithic.

Preferably, the sleeve extends lengthwise and defines an internal passageway that extends lengthwise between the distal end and the proximal end of the sleeve and through which the end portion of the optical fiber terminated with the ferrule extends.

In a preferred embodiment, the sleeve comprises a slot, extending lengthwise between distal and proximal ends of the sleeve, having a size such as to enable insertion of the end portion of the optical fiber.

Preferably, the distal portion of the body of the connector comprises, in its internal surface, a protrusion extending lengthwise, adapted to mate with the slot of the sleeve.

Preferably, the ferrule is associated with a spring and the sleeve defines an internal shoulder for the spring, proximate a distal end of the sleeve.

According to an embodiment, said at least one aperture on the later surface of the proximal portion of the body comprises two opposite pairs of apertures. Each pair of apertures may comprise, for example, two square brackets shaped apertures, facing each other with the open ends inwards.

The optical fiber connector assembly preferably comprises a nut configured to be disposed about the body of the connector.

Preferably, the nut is configured to fix the optical fiber connector assembly to a corresponding fiber optic receptacle.

Preferably, the body comprises a shoulder having an outer diameter greater than an inner diameter of the nut such that the travel of the nut in the lengthwise direction towards the distal end of the body is limited, while allowing the nut to freely rotate about the longitudinal axis relative to the body.

Preferably, said shoulder is substantially located in a medial portion of the body.

Preferably, the inner diameter of the nut is substantially located in correspondence of a proximal end of the nut.

In a preferred embodiment, the optical fiber connector assembly further comprises an additional nut configured to be disposed about the body. Preferably, the additional nut has a distal end adapted to engage with a proximal end of the nut.

Preferably, the plurality of engagement members defined by the flange of the ferrule is equally spaced in the angular direction in a cross section of the flange.

Preferably, the fiber optic cable comprises strength members comprising rod members that are trimmed off at the end portion of the fiber optic cable.

Suitably, the end portion of the optical fiber protrudes from the end portion of the fiber optic cable (the cable jacket being removed from the end portion of the fiber optic cable during assembling).

Preferably, the fiber optic cable comprises strength members comprising yarns that are folded back over the jacket of the end portion of the fiber optic cable so that said yarns are disposed between the proximal portion of the body of the connector and the external surface of the jacket at the end portion of the fiber optic cable.

Preferably, the fiber optic cable comprises a single optical fiber.

Preferably, the spring associated with the ferrule is disposed within the sleeve between an internal shoulder of the sleeve and the flange of the ferrule.

Preferably, the flange has an outer diameter greater than the outer diameter of the spring so as to stop the travel of the spring in the lengthwise direction beyond the flange, towards a distal end of the ferrule.

Preferably, the front face of the ferrule is accessible from the outside of the optical fiber connector assembly at the open front face of the distal portion of the body.

Preferably, in the pre-connectorized fiber optic cable the nut is disposed about the body of the connector so as to abut against the shoulder of the body at the inner diameter of the nut.

Preferably, in the pre-connectorized fiber optic cable, the additional nut is disposed about the body and clipped to a proximal end of the nut.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein:

FIG. 2 schematically shows a perspective view of an end portion of a fiber optic cable terminated with a ferrule and of a sleeve of the optical fiber connector assembly of the pre-connectorized fiber optic cable of FIG. 1;

FIG. 2a schematically shows an enlarged view of a distal portion of the sleeve of FIG. 2;

FIG. 3 schematically shows a perspective view of an end portion a fiber optic cable terminated with a ferrule together with a sleeve and a connector of the optical fiber connector assembly of the pre-connectorized fiber optic cable of FIG. 1;

FIG. 4 schematically shows a perspective view of an end portion of a fiber optic cable together with a sleeve, a connector, a crimping element, a nut and a shrinking sheath of the optical fiber connector assembly of the pre-connectorized fiber optic cable of FIG. 1;

DETAILED DESCRIPTION OF THE INVENTION

With reference to the figures, it is shown a pre-connectorized fiber optic cable comprising a fiber optic cable 1 and an optical fiber connector assembly 100 according to an embodiment of the invention.

Figure 1:
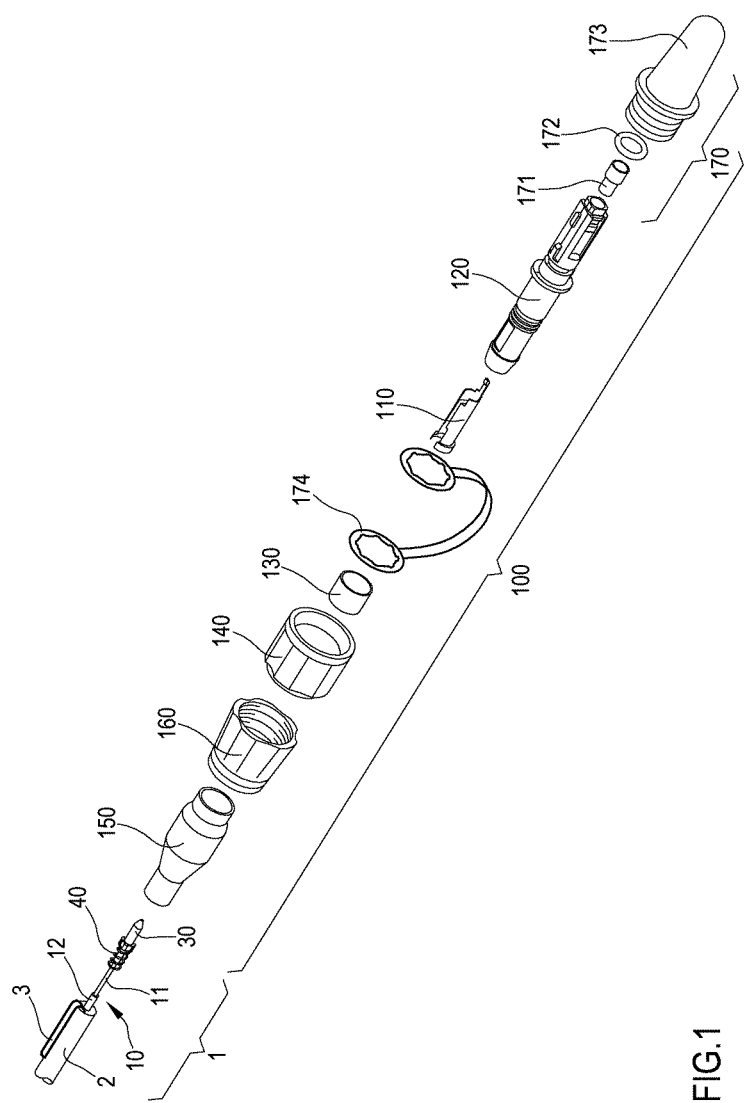
FIG. 1 schematically shows an exploded perspective view of an end portion of a pre-connectorized fiber optic cable according to an embodiment of the invention.

The fiber optic cable 1 comprises an outer protective cable jacket 2 housing a single optical fiber 10 and strength members. The strength members comprise flexible yarns 3 (like, for example, aramid yarns) and rod members (not shown), for example in the form of metallic rods. For the sake of illustration, the yarns 3 are shown only in FIG. 1.

The optical fiber 10 preferably is a single mode fiber comprising a core and a cladding (referred as a whole with the reference number 11). In a preferred embodiment, the core and the cladding are made of a glass material (e.g. silica-based), and a refractive index difference between the core and the cladding 11 is obtained by incorporating suitable additives (dopants) into the glass matrix of core and/or cladding. Generally, the optical fiber 10, outside the cladding 11, is provided with an external protective coating 12 made of a polymeric material, typically consisting of two layers. Generally, the diameter of the external protective coating 12 is of about 250 μm. Moreover, the outer diameter of the cladding 11 typically is of about 125 μm.

The optical fiber 10 has an end portion terminated with a ferrule 30.

The outer protective cable jacket 2 at the end portion of the fiber optic cable 1 is removed so that the end portion of the optical fiber 10 and the strength members protrude from the end portion of the fiber optic cable 1.

The ferrule 30 generally is a rigid hollow tube used to hold a stripped end of the optical fiber 10 (that is, stripped of its external protective coating 12) and has an internal diameter designed to hold the fiber firmly with a maximum packing fraction. The ferrule 30 provides a means of positioning the optical fiber 10 within the connector by performing the function of a bushing.

In the embodiment shown (see FIGS. 1-3), the ferrule 30 has a distal end 32 and a proximal end 34. The ferrule 30 defines an internal passageway that extends lengthwise between the distal end 32 and the proximal end 34 and within which the stripped end of the optical fiber 10 is firmly housed. The stripped end of the optical fiber 10 passes though the ferrule 30 such that a front face of the optical fiber 10 is substantially flush with the distal end 32 of the ferrule 30 or extends somewhat beyond the distal end 32.

The ferrule 30 is associated with a spring 40. The ferrule 30 comprises a proximal tubular portion 50 (preferably metallic) and a distal tubular portion (preferably made of glass) separated by a flange 52 (preferably metallic). The spring 40 is disposed about the proximal tubular portion 50 of the ferrule 30 and urges towards the flange 52. The flange 52 has an outer diameter greater than the outer diameter of the spring 40 so as to stop the travel of the spring 40 in the lengthwise direction towards the distal end 32 of the ferrule 30, beyond the flange 52.

In a preferred embodiment, the flange 52 comprises a plurality of grooves 51. Preferably, the grooves 51 are equal to each other and equally spaced in the angular direction, along the circumference of the flange 52. Preferably, the grooves 51 are four.

In the embodiment shown (see FIGS. 1-3), the optical fiber connector assembly 100 comprises a sleeve 110 and a connector 120.

The sleeve 110 extends lengthwise between opposed distal and proximal ends 112, 114 and defines an internal passageway that extends lengthwise between the distal end 112 and the proximal end 114 for housing the end portion of the optical fiber 10 and the ferrule 30, associated with the spring 40. Substantially at the distal end 112, the sleeve 110 defines an internal shoulder 115. The sleeve 110 preferably comprises a finger 116 projecting from the distal end 112.

The finger 116 provides a support for the assembly ferrule 30-spring 40. The spring 40 is disposed within the sleeve 110 between the internal shoulder 115 and the flange 52 of the ferrule 30.

The proximal end 114 of the sleeve 110 is configured to engage the end portion of the fiber optic cable 1 (as schematically shown in FIG. 3).

The sleeve 110 is preferably formed of plastic.

The finger 116 has a distal end with a protrusion 119. The protrusion 119 is preferably configured so as to engage one of the grooves 51 of the flange 52. Considering that the front face of the end portion of the optical fiber 10 can be angled, this enables to orientate the angled front face of the optical fiber 10 according to a number of positions corresponding to the number of the grooves 51. In the embodiment shown, the grooves 51 are preferably four and equally spaced in the angular direction so that the front face of the optical fiber 10 can be oriented according to four positions angularly spaced apart of 90°. This is advantageous because it increases the possibility of matching the angle of the front face of the optical fiber 10 with the angle of a mating optical fiber. This advantageously increases the flexibility of use of the optical fiber connector assembly 100.

Figure 10:
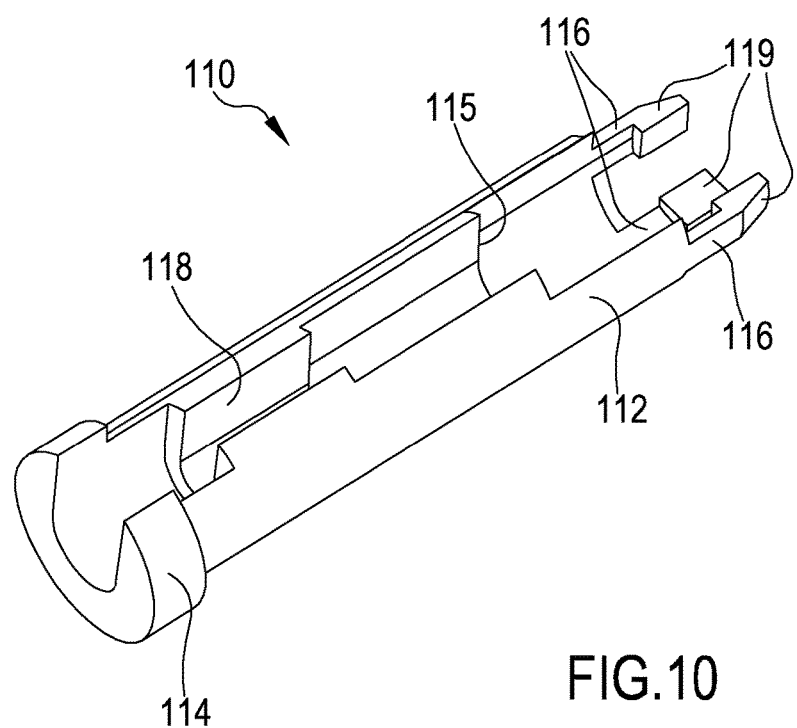
FIG. 10 schematically shows a perspective view of a sleeve of the optical fiber connector assembly of the pre-connectorized fiber optic cable of FIG. 1, according to a further preferred embodiment of the invention.

In a preferred embodiment shown in FIG. 10, the sleeve 110 preferably comprises three fingers 116 projecting from the distal end 112, providing a support for the assembly ferrule 30-spring 40. The presence of more than one finger 116 (in FIG. 10 three fingers 116 are exemplarily shown) advantageously enables to improve the firmness of the support function. Preferably, each finger 116 has a distal end with a corresponding protrusion 119 configured so as to engage one of the grooves 51 of the flange 52.

In a preferred embodiment, the internal passageway of the sleeve 110 has an inner diameter/size smaller than the outer diameter/size of the ferrule 30. This advantageously enables to limit the cross-section size of the sleeve 110.

In order to allow the end portion of the optical fiber 10 (which is pre-terminated with the assembly ferrule 30-spring 40) to be inserted within the sleeve 110, the latter preferably comprises a slot 118 extending lengthwise between the distal and proximal ends 112, 114, and having a size such as to enable insertion of the end portion of the optical fiber 10. Proximate the internal shoulder 115, the slot 118 has a greater size in the crosswise direction, so as to enable insertion of the spring 40 and ferrule 30. At the proximal end 114 of the sleeve 110, the slot 118 has a greater size in the crosswise direction, so as to fit the cable 1 and the ferrule 30 at opposite ends.

The connector 120 comprises a body 121 disposed about a longitudinal axis and extending lengthwise between a distal end 122 and a proximal end 124.

Preferably, the body 121 is monolithic (i.e. made of one piece).

The body 121 is preferably formed of plastic, for example blend of glass reinforced PPE (Polyphenyl ether) and PS (Polystyrene).

The body 121 defines an internal passageway that extends lengthwise between the distal end 122 and the proximal end 124. The internal passageway is configured so as to be able to house the optical fiber end, terminated with the assembly ferrule 30-spring 40 and housed in the sleeve 110.

The body 121 comprises a distal portion 123 and a proximal portion 125. The distal portion 123 acts as a plug ferrule housing for receiving the ferrule 30. The proximal portion 125 acts as cable housing for receiving the fiber optic cable end.

The distal portion 123 and the proximal portion 125 are generally cylindrical. The distal portion 123 and the proximal portion 125 substantially have a same outer diameter.

The distal portion 123 extends lengthwise between the distal end 122 and a generally medial portion of the body 12. The proximal portion 125 extends lengthwise between the proximal end 124 and the generally medial portion of the body 121. The distal portion 123 is preferably configured to mate with a corresponding fiber optic receptacle (as, for example, a standard SC adaptor). The distal portion 123 is preferably in the shape of a standard ferrule plug housing.

The distal portion 123 preferably comprises, in its internal surface, a protrusion (not shown) extending lengthwise, adapted to mate with the slot 118 of the sleeve 110 so as to prevent relative rotation between the sleeve 110 and the body 121 about the longitudinal axis of the body 121.

The distal portion 123 preferably comprises, in its outer surface, a circumferential groove 128 wherein a O-ring 129 is mounted. The O-ring 129 is preferably formed of rubber. The O-ring 129 is adapted to mate with a corresponding circumferential groove (not shown) of a fiber optic receptacle so as to perform a sealing function.

The proximal portion 125 has on its lateral surface, substantially at the proximal end 124, at least one aperture. In particular, in the embodiment shown in FIGS. 1 and 3, the proximal portion 125 has a single lateral aperture 127, preferably of a rectangular shape. Between the shoulder 126 and the aperture 127 there are also a plurality of grooves to provide grip for the shrinking sheath 150.

Figure 7:
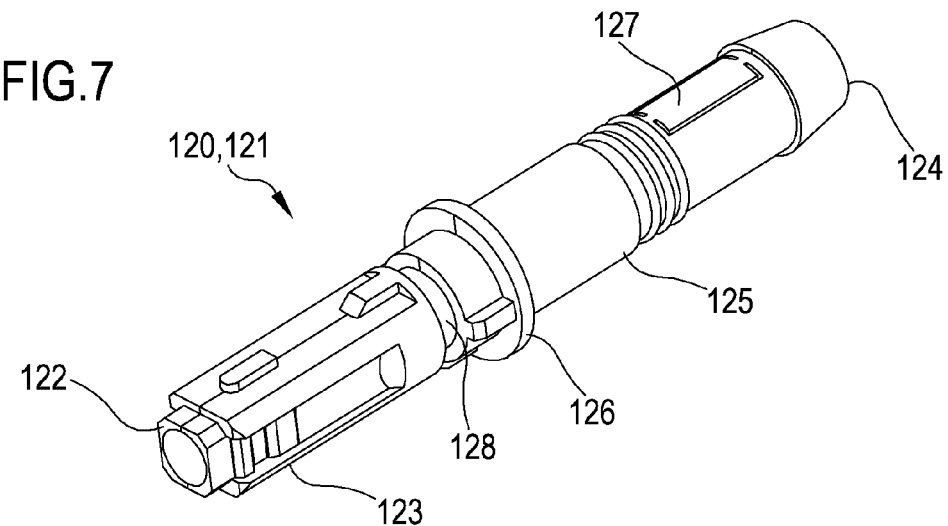
FIG. 7 schematically shows a perspective view of the body of the connector according to an alternative embodiment of the invention.
Figure 8:
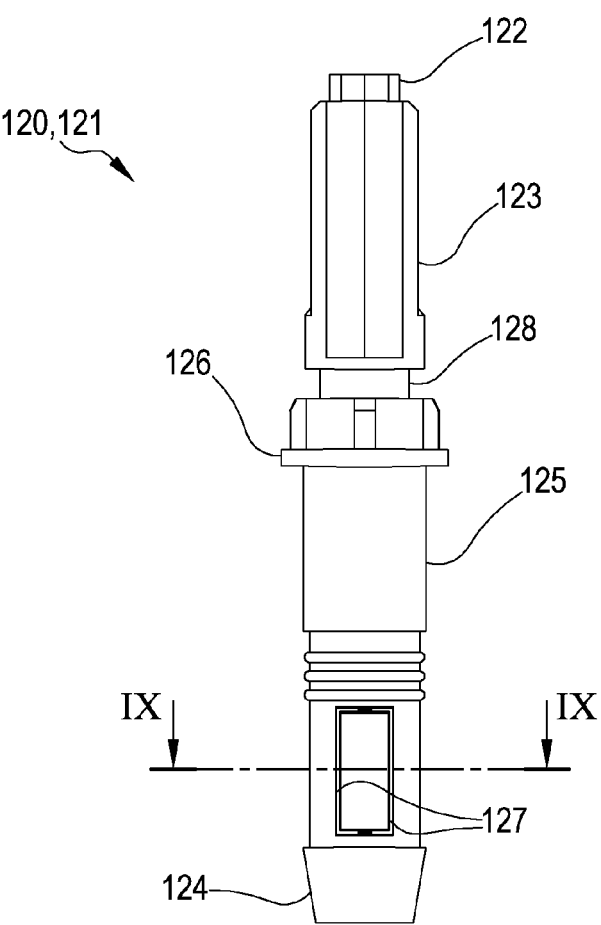
FIG. 8 schematically shows a top view of the body of the connector of FIG. 7.
Figure 9:
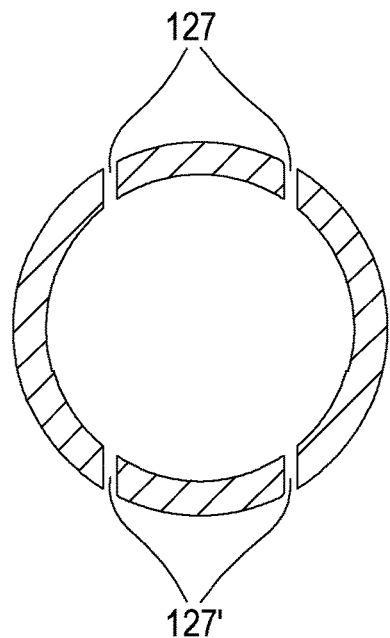
FIG. 9 schematically shows a cross-section of the body of the connector of FIG. 8, taken along line IX-IX.

In the alternative embodiment shown in FIGS. 7-9, the proximal portion 125 has two opposite pairs of lateral apertures 127, 127' (that is, diametrically opposed in a cross-section of the proximal portion 125). In the embodiment shown in FIGS. 7-9, each pair of lateral apertures 127, 127' comprises two square brackets shaped apertures, facing each other with the open ends inwards.

The distal portion 123 and the proximal portion 125 are preferably separated by a shoulder 126. The shoulder 126 has an outer diameter greater than the outer diameter of the distal portion 123 and the proximal portion 125.

The optical fiber connector assembly 100 further comprises a crimping element 130 (see FIG. 4) to fix the proximal portion 125 of the body 121 to the end portion of the fiber optic cable 1. The crimping element 130 is adapted to be disposed about the proximal portion 125 at the single aperture 127 (or at the two opposite pairs of apertures 127, 127') and to grip the yarns 3 (previously folded back over the cable jacket 2, as explained in more detail below) and the cable jacket 2.

The crimping element 130 preferably is a hollow cylindrical ring. The crimping element 130 can be, for example, metallic.

Figure 5:
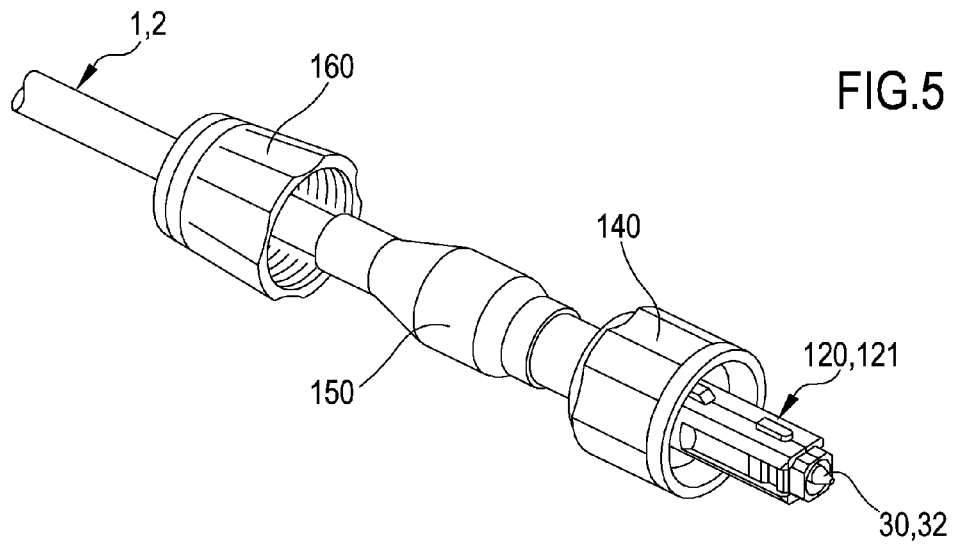
FIG. 5 schematically shows a perspective view of an end portion of the fiber optic cable together with a sleeve, a connector, a crimping element, a nut, a shrinking sheath and an additional nut of the optical fiber connector assembly of the pre-connectorized fiber optic cable of FIG. 1.

The optical fiber connector assembly 100 further comprises a nut 140 (see FIGS. 4-6) which is configured to be disposed about the body 121 and to fix the optical fiber connector assembly 100 to a corresponding fiber optic receptacle (not shown). The nut 140 may have an internal/external thread (respectively shown in FIGS. 6a and 6b) to threadably engage the fiber optic receptacle by mating with a corresponding external/internal thread of a receiving portion of the fiber optic receptacle.

The nut 140 has a proximal portion with an inner diameter lower than the outer diameter of the shoulder 126 of the body 121 and a distal portion with an inner diameter greater than the outer diameter of the shoulder 126 of the body 121. In this way, the nut 140 is disposed in part about the proximal portion 125 of the body 121 and in part (preferably, mainly) about the distal portion 123 of the body 121. In addition, the travel of the nut 140 in the lengthwise direction towards the distal end 122 of the body 121 is limited, while allowing the nut 140 to freely rotate about the longitudinal axis relative to the body 121.

The nut 140 is preferably formed of plastic.

The optical fiber connector assembly 100 further comprises a shrinking sheath 150 (see FIGS. 4-6) which is configured to heat shrink around the end portion of the fiber optic cable 1 and the proximal portion 125 of the body 121. The shrinking sheath 150 provides additional retention to the cable jacket 2 and seals the back of the fiber connector assembly 100 around the cable jacket 2. Since the shrinking sheath 150 fits tightly about the cable jacket 2, it seals the optical fiber connector assembly 100 from the environment and protect against environmental degradation. The shrinking sheath 150 could be formed, for example, of Polyolefin (PDX), Elastomer (PES), Fluoropolymer (FPM), Polyvinylidenefluoride (PVDF) and Polytetrafluorethylene (PTFE).

The optical fiber connector assembly 100 could also comprise an additional nut 160 (see FIGS. 5-6), for example formed of rubber, adapted to provide further protection to the back of the optical fiber connector assembly 100 and an additional grip for a user. A distal end of the additional nut 160 is preferably configured to mate with a proximal end of the nut 140, for example by clipping.

In a preferred embodiment (shown in FIG. 1 only), the optical fiber connector assembly 100 could also comprise a dust cap 170 to protect the optical fiber connector assembly 100 when it is not coupled to a corresponding receptacle.

The dust cap 170 comprises a first cap 171 for the front face of the ferrule 30, a second cap 173 having a proximal portion with a thread adapted to mate with the thread of the nut 140, and a sealing O-ring 172 adapted to mate with corresponding engagements in the first and second caps 171, 173 so as to perform a sealing function. The dust cap 170 preferably also comprises a lanyard 174 having to rings at two opposed ends. The rings are adapted to engage, on one side, the optical fiber connector assembly 100 and, on the other side, the dust cap 170 such that when the dust cap is removed from the optical fiber connector assembly 100, the dust cap 170 remains coupled to it.

During installation, an end portion of the fiber optic cable 1 is prepared for termination. The cable jacket 2 at the end portion is removed. The rod members are trimmed so that they are not coupled to the optical fiber connector assembly 100. The yarns 3 are folded back over the cable jacket 2. The optical fiber 10 is terminated to the assembly spring 40-ferrule 30. This latter assembly is then accommodated within the sleeve 110 (see FIG. 3) so that the spring 40 is located between the internal shoulder 115 of the sleeve 110 and the flange 52 of the ferrule 30 and so that the ferrule 30 is biased forwardly. The proximal end 114 of the sleeve 110 is coupled to the end face of the fiber optic cable 1.

By means of the engaging protrusion(s) 119 of the finger (s) 116 and the grooves 51 of the flange 52, the ferrule 30 is properly polarized within the sleeve 110. In other words, the ferrule 30 is positioned within the sleeve 110 (in the example by rotation steps of 90°) so that the angled front face of the optical fiber 10 is properly oriented according to the orientation of the angled front face of the optical fiber in the mating receptacle.

As shown in FIG. 4, the additional nut 160, the shrinking sheath 150, the nut 140 and the crimping element 130 and the O-ring 129 are slid backwardly along the sleeve 110 and the end portion of the fiber optic cable 1. The body 121 is then slid backwardly along the sleeve 110 and the end portion of the fiber optic cable 1 until the sleeve 110 is positioned into the distal portion 123 of the body 121, the front face of the ferrule 30 is exposed through the front face of the body 121 and the proximal portion 125 of the body 121 is disposed about the cable jacket 2 with the folded back yarns 3 disposed therebetween. The internal protrusion of the distal portion 123 of the body 121 and the slot 118 of the sleeve 110 are engaged. Then, the O-ring 129 is slid forwardly along the body 121 until it engages the corresponding circumferential groove 128. The crimping element 130 is slid forwardly along the body 121 until it is disposed at the single aperture 127 (or opposite pairs of aperture 127,127'). Then it is crimped to grip the yarns 3 (previously folded back over the cable jacket 2) and the cable jacket 2.

The nut 140 is then slid forwardly along the body 121 until its travel is stopped by the shoulder 126. Thereafter, the shrinking sheath 150 is heat shrunk around the end portion of the fiber optic cable 1 and the proximal portion 125 of the body 121. In order to complete the assembly, the additional nut 160 is slid forwardly along the body 121 until it clips the back portion of the nut 140 (see FIG. 5).

Figure 6A:
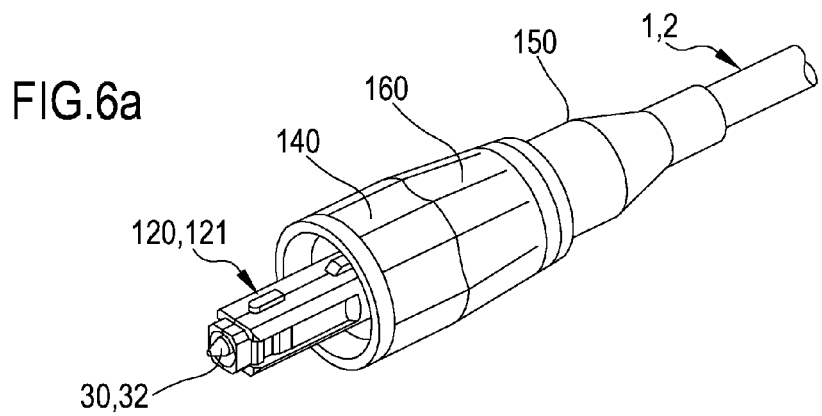
FIG. 6a schematically shows a perspective view of the pre-connectorized fiber optic cable of FIG. 1 wherein the optical fiber connector assembly is assembled.
Figure 6B:
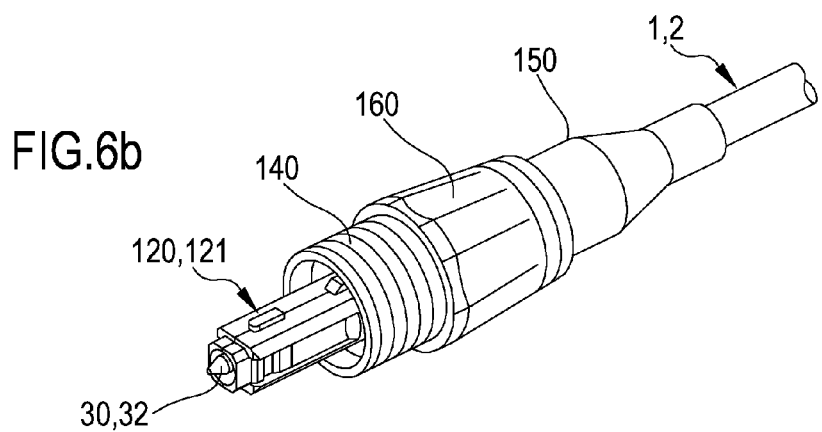
FIG. 6b schematically shows a perspective view of the pre-connectorized fiber optic cable of FIG. 1 wherein the nut is made according to an alternative embodiment of the invention.

The assembly is thus completed, as shown in FIG. 6a and in the variant of FIG. 6b.

The pre-connectorized fiber optic cable, with the optical fiber connector assembly 100 thus assembled, is ready to be coupled to a corresponding fiber optic receptacle (not shown). The fiber optic receptacle can comprise, for example, a receptacle body having an internal passageway extending through opposite ends. The internal passageway may accommodate proximate a first end of the opposite ends a hollow adapter sleeve (e.g. a standard SC adaptor) adapted to receive the distal portion 123 of the body 121 (e.g. shaped as a standard SC connector). At said first end, the fiber optic receptacle preferably also comprises an externally/internally threaded portion for engaging the internal/external thread of the nut 140. Proximate the second end, the internal passageway may accommodate a further hollow adapter sleeve adapted to receive a connector coupled to a mating optical fiber.

It will be clear from the above description that the optical fiber connector assembly of the present description can be coupled to the end portion of the fiber optic cable by means of an improved mechanical coupling. Indeed, the body 121 of the connector—formed as a single piece comprising a distal portion for housing the sleeve and mating with a corresponding receptacle, and a proximal portion with at least one lateral aperture 127, 127'—enables the end portion of the fiber optic cable to be directly coupled to the connector by means of the crimping element 130, at the at least one aperture 127, 127' of the distal portion 123. This advantageously allows to limit the number of mechanical couplings, to increase the mechanical strength and, in particular, the tensile strength of the optical fiber connector assembly, and to simplify the assembling thereof. In addition, the sleeve 110 is housed within the distal portion 123 of the body without direct mechanical coupling with the end portion of the cable. This protects the sleeve 110 and the optical fiber 10 from any strain imparted to the fiber optic cable 1. Moreover, it enables to simplify the production of the sleeve 110 and its assembling into the optical fiber connector assembly.

The invention claimed is:

1. An optical fiber connector assembly for a fiber optic cable comprising an optical fiber having an end portion terminated with a ferrule, the optical fiber connector assembly comprising:
   a sleeve configured to at least partially house the end portion of the optical fiber terminated with the ferrule;
   a connector comprising a body extending lengthwise and having an internal passageway for the sleeve, the body having a distal portion configured to house the sleeve and to mate with a corresponding receptacle, and a proximal portion configured to be coupled to an end portion of the fiber optic cable, the proximal portion having on its lateral surface at least one aperture; and
   a crimping element adapted-to couple the proximal portion of the body to the end portion of the fiber optic cable at said at least one aperture.

2. The optical fiber connector assembly according to claim 1, wherein the sleeve comprises at least one finger projecting from a distal end of the sleeve.

3. The optical fiber connector assembly according to claim 2, wherein the ferrule comprises a flange, each finger defining an engagement member adapted to mate with one of a corresponding plurality of engagement members defined by the flange.

4. The optical fiber connector assembly according to claim 2 wherein the at least one finger is configured to provide a support for the ferrule so that a distal end of the ferrule projects beyond the at least one finger.

5. The optical fiber connector assembly according to claim 1, wherein the body of the connector is monolithic.

6. The optical fiber connector assembly according to claim 1, wherein the sleeve extends lengthwise and defines an internal passageway that extends lengthwise between the distal end and the proximal end of the sleeve and through which the end portion of the optical fiber terminated with the ferrule extends.

7. The optical fiber connector assembly according to claim 1, wherein the sleeve comprises a slot extending lengthwise between distal and proximal ends of the sleeve having a size such as to enable insertion of the end portion of the optical fiber.

8. The optical fiber connector assembly according to claim 7, wherein the distal portion of the body of the connector comprises, in an internal surface thereof, a protrusion extending lengthwise, adapted to mate with the slot of the sleeve.

9. The optical fiber connector assembly according to claim 1, wherein the ferrule is associated with a spring, the sleeve defining an internal shoulder for the spring, proximate a distal end of the sleeve.

10. The optical fiber connector assembly according to claim 1, wherein said at least one aperture on the lateral surface of the proximal portion of the body comprises two opposite pairs of apertures.

11. The optical fiber connector assembly according to claim 1, comprising a nut configured to be disposed about the body of the connector.

12. The optical fiber connector assembly according to claim 11, wherein the nut is configured to fix the optical fiber connector assembly to a corresponding fiber optic receptacle.

13. A pre-connectorized fiber optic cable comprising a fiber optic cable and an optical fiber connector assembly mounted upon an end portion of the fiber optic cable, the fiber optic cable comprising a cable jacket accommodating an optical fiber having an end portion terminated with a ferrule, the optical fiber connector assembly comprising:
   a sleeve at least partially housing the end portion of the optical fiber terminated with the ferrule;
   a connector comprising a body extending lengthwise and having an internal passageway for the sleeve, the body having a distal portion housing the sleeve and a proximal portion disposed about the end portion of the fiber optic cable, the proximal portion having on its lateral surface at least one aperture; and
   a crimping element crimped about the proximal portion of the body at said at least one aperture so as to couple said proximal portion of the body to the end portion of the fiber optic cable.

14. The pre-connectorized fiber optic cable according to claim 13, wherein the fiber optic cable comprises strength members comprising rod members that are trimmed off at the end portion of the fiber optic cable.

15. The pre-connectorized fiber optic cable according to claim 13, wherein the fiber optic cable further comprises strength members comprising yarns that are folded back over the cable jacket of the end portion of the fiber optic cable so that said yarns are disposed between the proximal portion of the body of the connector and the external surface of the cable jacket at the end portion of the fiber optic cable.

16. The pre-connectorized fiber optic cable according to claim 13, wherein the fiber optic cable comprises a single optical fiber.

* * * * *